United States Patent [19]

Knitig

[11] Patent Number: 4,830,340
[45] Date of Patent: May 16, 1989

[54] ROPE GRIP APPARATUS

[75] Inventor: Gerald M. Knitig, Hydro, Okla.

[73] Assignee: Willie Loree Franklin, Eakly, Okla.; a part interest

[21] Appl. No.: 133,793

[22] Filed: Dec. 14, 1987

[51] Int. Cl.$^4$ .................... B65H 59/16; F16G 11/00
[52] U.S. Cl. .................. 254/391; 24/115 L; 24/136 A; 182/5; 188/65.4; 410/103
[58] Field of Search ............. 254/389, 390, 391, 393, 254/395, 396, 397; 188/65.1, 65.4; 182/5, 231; 410/96, 97, 100, 103, 101; 104/229, 235; 24/115 L, 115 M, 136 R, 136 A

[56] References Cited

U.S. PATENT DOCUMENTS

| 84,450 | 11/1968 | Weaver | 24/133 |
|---|---|---|---|
| 930,580 | 8/1909 | Weinstock | 182/5 X |
| 1,413,690 | 4/1922 | Slocum | 188/65.4 |
| 1,896,415 | 11/1931 | Pyles | 188/65.5 |
| 1,931,346 | 10/1933 | Fries et al. | 24/136 |
| 1,956,903 | 10/1933 | Klien | 114/199 |
| 2,557,499 | 6/1951 | Davis | 24/68 CD |
| 2,681,793 | 6/1954 | Miller | 254/397 |
| 3,198,290 | 9/1965 | Maid | 188/65.1 |
| 3,739,875 | 6/1973 | Clark-Padwicki | 188/65.4 X |
| 3,874,632 | 4/1975 | Rago | 182/3 |
| 4,054,183 | 10/1977 | Boniface | 188/65.4 X |
| 4,223,761 | 9/1980 | Sonnberger | 182/5 |
| 4,256,199 | 3/1981 | Sellards | 254/333 X |

FOREIGN PATENT DOCUMENTS

| 83775 | 12/1894 | Fed. Rep. of Germany . | |
|---|---|---|---|
| 1236869 | 3/1967 | Fed. Rep. of Germany . | |
| 255198 | 1/1949 | Switzerland | 254/396 |
| 1236869 | 3/1972 | United Kingdom . | |
| 1444853 | 9/1976 | United Kingdom . | |

Primary Examiner—Joseph J. Hail, III
Attorney, Agent, or Firm—Victor Flores

[57] ABSTRACT

A rope grip apparatus for use in the field of tying down cargo in delivery trucks, construction, tying down aircraft, mountain climbing, farming, ranching, boating or other similar uses where rope is used and is typically tied in knots to secure articles while in transit, use, or storage. The rope grip apparatus includes a rope-receiving member having a hingeably secured and latchable rope-gripping member. The functional elements of the rope grip apparatus include a springed latch, and a plurality of ratcheted, grooved pulley rollers. In using the apparatus, a rope is threaded between the grooved pulley rollers located within the rope-receiving member and the rope-gripping member and unidirectionally clamped therebetween by latching the apparatus.

14 Claims, 2 Drawing Sheets

ROPE GRIP APPARATUS

FIELD OF THE INVENTION

The present invention generally relates to cargo tying devices. More particularly, the present invention relates to a rope grip apparatus for use in the field of tying down cargo, in delivery trucks, construction, tying down aircraft, mountain climbing, farming, ranching and boating or other similar uses where rope is used and is typically tied in knots to secure articles while in transit, use, or storage.

DESCRIPTION OF THE PRIOR ART

Apparatus for gripping ropes and tying down cargo are well known and have been presented in a variety of patented apparatus. Such patented rope gripping apparatus as they relate to the present invention can be categorized according to their teachings.

Examples of patents teaching the meshing of a rope between rollers in a "jaw-like" fashion, can be found in German Pat. No. 83,775 to Tarnowski, German Pat. No. 1,236,869 to Pohlig-Heckel-Bleichert Vereinigte Maschinen-Fabriken A.G. and U.S. Pat. No. 2,557,499 to Davis, which teaches a cargo tie down apparatus commonly known as a "come along", comprised of a cable, a lever, a fulcrum roll, an anchor hook, a snubber roll and a cable catch.

Other patents that relate to the present invention, which have included a rachet assembly with the gripping roller members, include, U.S. Pat. No. 1,896,415 to Pyles, wherein a line tightener is comprised of a frame having slip members of like construction including jaws having longitudinally staggered rollers and having grooved rims to receive a cable. Also, in U.S. Pat. No. 3,874,632 to Rago rollers are meshed to increase friction on a cord looped therebetween and act as a brake. This patent and further teaches engaging of pulleys having rachet teeth to lock the movement of a cord looped therebetween.

Other related prior art can be found in U.S. Pat. No. 3,198,290 to Maio which teaches the knurled treatment of the grooved periphery on sheaves and the pinching or snubbing action on a line strung between sheaves. U.S. Pat. No. 1,931,346 to Fries, et. al. teaches a device for grasping and holding a line in tension.

While the prior art has taught a variety of rope gripping apparatus, none have been provided in a manner that combines rope gripping pulley rollers having grooved lining with a pawl and gear wheel rachet assembly and that may be latched and released by spring actuated mechanisms. Further, none have been provided such that the grip apparatus are compact and easy to carry and are manufacturable in a plurality of sizes and inexperience to produce.

Consequently, a need is seen to exist for a rope grip apparatus that is provided with the features of a positive unidirectional grip, that is attributable to an improved design, which meshes a rope between rollers having the grooves lined with a suitable material which will impart friction on the rope in combination with the unidirectional function of a pawl and gear wheel ratchet assembly and which apparatus has a latch and release mechanism.

SUMMARY OF THE INVENTION

The present invention provides an improved rope grip apparatus designed to satisfy the aforementioned needs. Therefore, a primary object of the invention is directed at providing a compact rope grip apparatus for use in the field of tying down cargo in delivery trucks, construction, tying down aircraft, mountain climbing, farming, ranching and boating or other similar uses where rope is used and is typically tied in knots to secure articles while in transit, use, or storage.

In realization of this primary object, a rope-receiving member and a hingeably secured and latchable rope-gripping member are provided with a plurality of grooved pulley rollers of equal diameter, but with different groove depth for better rope surface contact, such that when a rope is threaded therebetween the rope-receiving member and the rope-gripping member the rope will be releasably clamped. More particularly, the rope-receiving member is provided with a channeled end to receive the rope, a hinge point for the rope gripping member, an anchor means in line with the rope end to be tightened, a springed latch and release mechanism and a plurality of grooved pulley rollers. A pawl and gear wheel ratchet assembly is mounted on a side of each pulley roller and to the side plate enclosure of the rope-receiving member to assure unidirection rotational movement of the pulley rollers. Also, the grooved pulley rollers are provided with a friction lining such as a neoprene, each grooved pulley is selected according to a predetermined size, according to a plurality of sizes of ropes for which the roller grip apparatus is to be manufactured. Each pulley, roller and side mounted gear wheel assembly being pin mountably secured and longitudinally spaced between two plates, said plates having a plurality of spaced support pins to add rigidity to the rope-receiving end member. The spacing between the plates being equivalent to the thickness of the pulleys and pawl assembly. The rope gripping member is also provided with plurality of grooved pulley rollers, the rollers being similarly pin mountably secured and longitudinally spaced between two plates similar to the rope-receiving member. The pulley rollers on the rope gripping member rollers are mountably offset with respect to the plurality of rollers on the rope-receiving member, so that when the apparatus is closed, the rollers on the rope gripping member will fit between each roller on the rope-receiving member and therebetween grip a rope which has been previously threaded under and over the plurality of rollers on the rope-recieivng member. The grooves within the pulley rollers on the rope gripping member are also provided with a friction lining such as neoprene and are shallower than the grooves of the pulley rollers of rope-receiving member. The pulley rollers on the rope gripping member are also provided with a pawl and gear wheel ratchet assembly mounted on a side of each pulley roller and to the side plate enclosing the pulleys to further assure unidirection rotational movement of the rollers. A latch and release mechanism is also provided at the opposite end of the hinge point to compactly contain the two hinged members, yet also allow continued unidirectional tightening of a rope clamped therein. The release mechanism includes a pop-up spring to conveniently separate the receiving and gripping member.

A typical method of using the rope grip apparatus may include:

1. receiving a single portion of a rope at a predetermined tie-down point;
2. threading the rope under a plurality of rollers of a rope-receiving member;

3. looping the rope over the same plurality of rollers in a fold back manner;

4. positioning the rope in the groove portion of the plurality of rollers;

5. clamping down onto the rope the rope gripping member;

6. latching the rope-receiving member and the rope gripping member;

7. anchoring the rope grip apparatus to a suitable anchor point;

8. tightening the rope to an adequate pull force; and

9. Releasing the latch after use is completed.

Therefore, to the accomplishments of the foregoing object, the invention consists of the foregoing features hereinafter fully described and particularly pointed out in the claims, the accompanying drawing and following disclosure describing in detail the invention, such drawing and disclosure illustrating, however, but one of the various ways in which the invention may be practiced.

DETAILED DESCRIPTION OF THE PREFERRED EMBODIMENT

Figure 1:
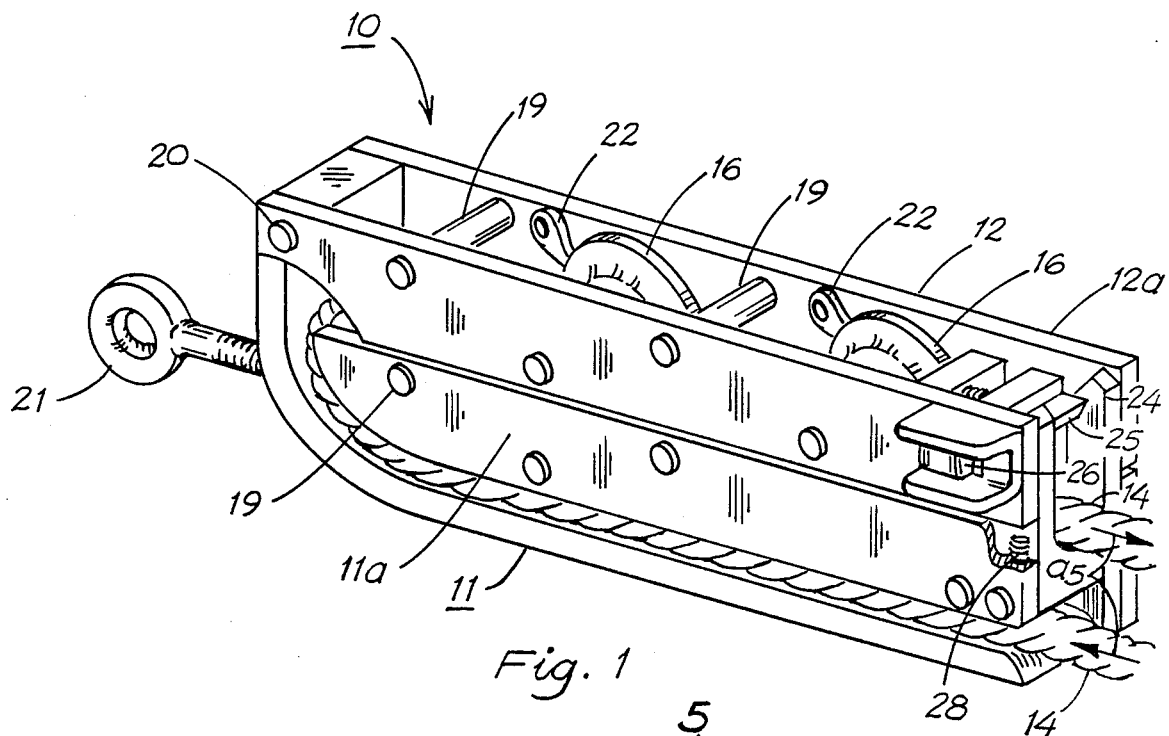
FIG. 1 shows a perspective view of the present invention with a rope-receiving member and rope-gripping member in a closed and latched position and having a rope threaded and unidirectionally clamped in the apparatus.
Figure 2:
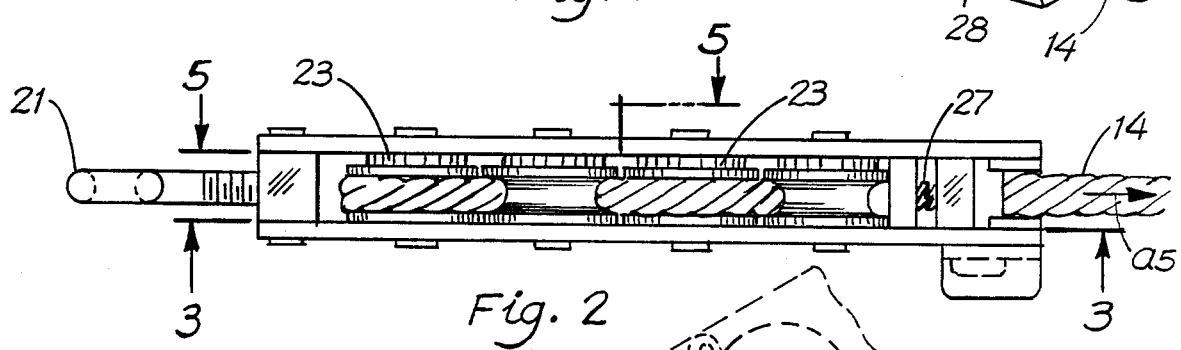
FIG. 2 is a top elevation plan view showing the rope threaded and secured between the upper rope-gripping member pulley rollers and the lower rope-receiving member pulley rollers.

Referring now to the drawings, and more particularly to FIG. 1, there is shown a rope grip apparatus, generally designated 10, which comprises the preferred embodiment of the invention. The apparatus includes a rope-receiving member 11, a rope-gripping member 12, with pulley rollers 16, whereby a rope 14 is unidirectionally clamped therebetween members 11 and 12, as shown by arrows a5. Members 11 and 12 are releasably latched by upper latch member 24 and lower latch member 25. The present invention is shown having members 11 and 12 constructed with side plates 11a and 12a, respectively, whereby the side plates 11a and 12a are fixedly spaced by pins 19. The apparatus is provided with a latch release 26 located on rope-gripping member 12 at an end opposite hinge point 20 and with a pop-up spring 28 located on rope-receiving member 11 and also located at an end opposite hinge point 20. Also shown in FIG., 1 is an in-line eyebolt anchor 21 located on rope-receiving member 11 for securing the apparatus at the tie-down point.

The unidirectional action of the apparatus is best illustrated in FIGS. 2, 3, 4, and 5 wherein rope 14 is shown being threaded into channel entry 18a in the direction of arrow a5 and towards the hinged end of the apparatus 10 and around the furthest pulley roller 15 of the rope-receiving member 11. With the apparatus 10 in the open position, the rope is folded back over pulleys 15 and positioned in grooves 17a of pulleys 15 in the direction of arrows a5 and exits at exit 18b. In closing apparatus 10, rope-gripping member 12 is pivoted about hinge point 20 and thereby bringing grooves 17b of pulleys 16 over previously positioned rope 14. In closing apparatus 10, the longitudinally spaced and alternating rollers 15 and 16 further positions rope 14 into grooves 17a and 17b to come into closely mechanically coupled relationship with groove lining material 17c. By referring to FIG. 4, it can be seen that grooves 17a and 17b are by design provided with depths d' and d, respectively, for a further mechanical advantage of greater circumferential enclosure of rope 14. Apparatus 10 is latched by engaging latch 24 over latch member 25 by compression of spring 27 and unlatched by compression of spring 27 with latch release 26 and opened by pop-up spring 28, see FIG. 1.

Figure 3:
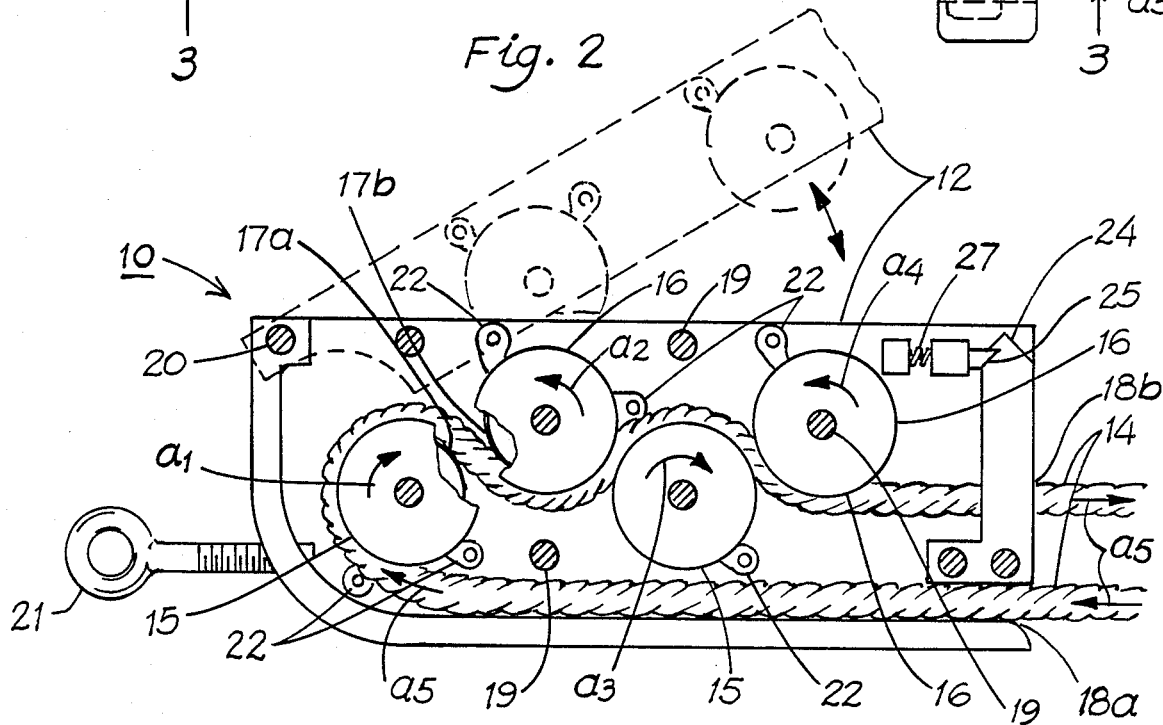
FIG. 3 is a side cross-sectional view of the rope grip apparatus taken along line 3—3 in FIG. 2, showing the apparatus in a latched and unlatched position and showing the foldback and threading of the rope through the receiving channel and between the upper rope-gripping member and the lower rope-receiving member.
Figure 4:
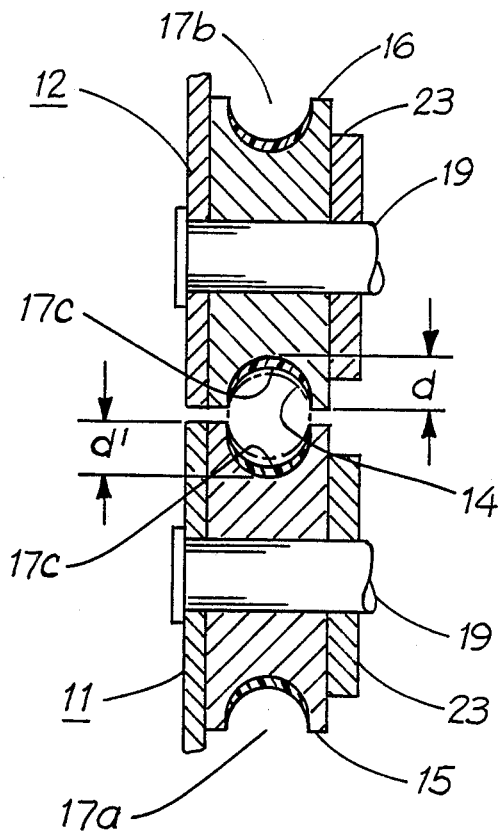
FIG. 4 is an enlarged cross-sectional view of an upper rope-gripping pulley roller and a lower rope-receiving pulley roller taken along 4—4 in FIG. 5 showing the roller groove lining and the roller groove depth difference with a rope threaded between the rollers.
Figure 5:
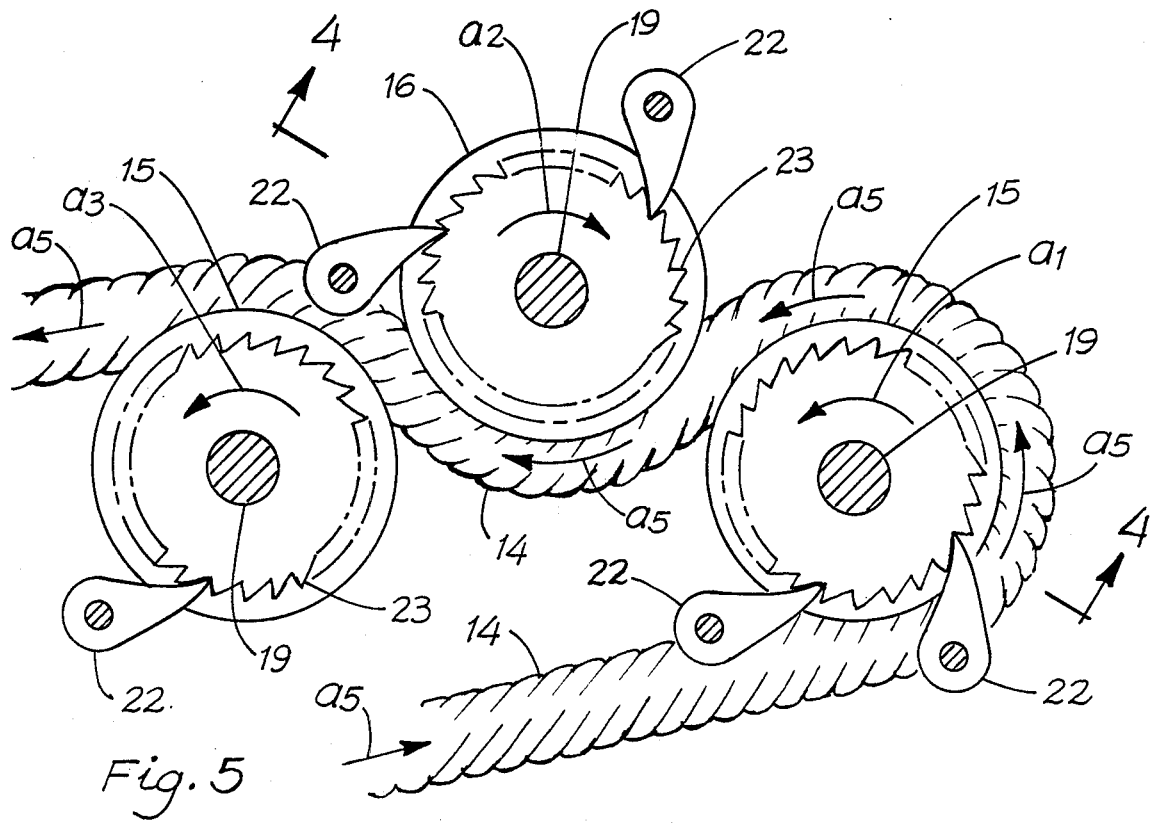
FIG. 5 is an enlarged cross-sectional view of the rollers in FIG. 2, taken along line 5—5 in FIG. 2, showing a rope threaded between the rollers, the opposing direction of rotation of the rollers, and the ratchet assemblies attached to the sides of the rollers.

FIGS. 3 and 5 best illustrate the unidirectional gripping of apparatus 10 when in the latched position. Therein, it is shown that rope 14 can be pulled in the direction of arrows a5, causing pulleys 15 to rotate in the direction of arrows a1 and a3 and concurrently causing rotation of pulleys 16 in the direction of arrows a2 and a4. Pulleys 15 and 16 are prevented from rotation in direction opposite arrows a5 by pawls 22 mounted on plates 11a and 11b gear wheels 23 fixedly mounted on pulleys 15 and 16, best seen in FIG. 5.

Therefore, the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. A rope grip apparatus for use in the field of securing articles where rope is used and is typically tied in knots to secure said articles while in transit, use, or storage, said rope grip apparatus comprising:
   (a) a rope-receiving means;
   (b) a rope-gripping means hingeably attached to said rope-receiving means, said rope-gripping means pivotally gripping said rope;
   (c) a roller means attached to said rope-receiving means and said rope-gripping means;
   (d) a ratchet means attached to said roller means; and
   (e) a latch means attached to said rope-receiving means and said rope-gripping means, said latch means clamping said rope-receiving means to said rope-gripping means and compressively securing said rope therebetween.

2. A roller grip apparatus, as recited in claim 1, wherein said roller means further includes a plurality of grooved pulley rollers of a preselected size determined by the size of rope for which said roller grip apparatus is to be manufactured.

3. A roller grip apparatus, as recited in claim 1, wherein:

(a) said rope-receiving means includes two side plates;
(b) said rope-gripping means includes two side plates;
(c) said side plates are separated by the combined thickness of said roller means and said ratchet means; and
(d) said rope-receiving means and said rope-gripping means further include a plurality of spaced support pins to add rigidity to said rope-receiving means and said rope-gripping means.

4. A roller grip apparatus as recited in claim 1, wherein:
(a) said roller means further comprises:
  (i) a plurality of grooved rollers attached to said rope-receiving means; and
  (ii) a plurality of grooved rollers attached to said rope-gripping means; and
(b) said ratchet means further comprises:
  (i) a plurality of gear wheels attached to said grooved rollers; and
  (ii) a plurality of pawls attached to said rope-receiving means and to said rope-gripping means to assure unidirectional rotational movement of said rollers.

5. A roller grip apparatus for use in the field of securing articles where rope is used and is typically tied in knots to secure said articles while in transit, use, or storage, comprising:
(a) a rope-receiving means including:
  (i) a hinge point,
  (ii) two parallel side plates,
  (iii) a eyebolt anchor attachment, and
  (iv) a rope threading channel;
(b) a rope-gripping means having two parallel side plates, said rope-gripping means being hingeably attached to said rope-receiving means and having a pivot point coinciding with said hinge point of said rope-receiving means;
(c) a roller means, said roller means including a plurality of grooved pulley rollers pin mounted and longitudinally spaced between said side plates of said rope-receiving means and said rope-gripping means;
(d) a ratchet means including,
  (i) a plurality of gear wheels attached to said grooved pulley rollers, and
  (ii) a plurality of pawls attached to said rope-receiving means and to said rope-gripping means to assure unidirectional rotation of said pulley rollers; and
(e) a latch means, said latch means including a latch, a latch release and a pop-up release spring, said latch means clamping said rope receiving means to said rope gripping means.

6. A roller grip apparatus, as recited in claim 5, wherein said plurality of grooved pulley rollers further includes:
(a) a preselected size determined by a particular size of rope for which the roller grip apparatus is to be manufactured;
(b) each pulley roller having a grooved portion lined with a friction lining;
(c) said pulley rollers attached to said rope-receiving means are provided with deeper grooves than similarly provided grooves on said rollers attached to said rope-gripping means; and
(d) said pulley rollers mounted within said rope-gripping means are offset with respect to said pulley rollers mounted within said rope-receiving means to mesh between said pulley rollers mounted within said rope-receiving means.

7. A roller grip apparatus, as recited in claim 5, wherein:
(a) said plurality of grooved pulley rollers further includes,
  (i) a preselected size determined by a particular size of rope for which the roller grip apparatus is to be manufactured,
  (ii) each pulley roller having a grooved portion lined with a friction lining,
  (iii) said pulley rollers attached to said rope-receiving means are provided with deeper grooves than grooves similarly provided on said pulley rollers attached to said rope-gripping means, and
  (iv) said pulley rollers mounted within said rope-gripping means are offset with respect to said pulley rollers mounted within said rope-receiving means to mesh between said rollers mounted within said rope-receiving means;
(b) said gear wheels and said pawls further include a first direction of rotation of said pulley rollers attached to said rope-gripping means that is opposite to a second direction of rotation of said pulley rollers attached to said rope-receiving means;
(c) said side plates are separated by the combined thickness of said roller means and said ratchet means;
(d) said rope-receiving means and said rope-gripping means further include a plurality of spaced support pins to add rigidity to said rope-receiving means and said rope-gripping means;
(e) said latch further comprises a springed latch assembly fixedly attached to said rope-receiving means;
(f) said latch release further comprises a latch release assembly fixedly attached to said rope-gripping means for mechanically communicating with said springed latch assembly; and
(g) a pop-up spring mounted on said rope-receiving means to separate said rope-gripping means from said rope gripping means when said latch release assembly is operated.

8. A rope securing method for tying down articles in transit, use, or storage where rope is used and is typically tied in knots, said method comprising the steps of:
(a) receiving a single portion of a rope at a predetermined tie-down point;
(b) providing a roller grip apparatus including:
  (i) a rope-receiving means, including a hinge point, a eyebolt anchor attachment, and a rope threading channel,
  (ii) a rope-gripping means hingeably attached to said rope-receiving means,
  (iii) a roller means, including a plurality of grooved pulley rollers pin mounted and longitudinally spaced within said rope-receiving means and said rope-gripping means and each having a grooved surface lined with a friction material,
  (iv) a ratchet means, including a plurality of gear wheels fixedly attached to said rollers and a plurality of pawls attached to said rope-receiving means and to said rope-gripping means to assure unidirectional rotation of said rollers, and
(b) a latch means;

(c) threading said single portion of a rope under said plurality of grooved pulley rollers on said rope-receiving means;

(d) looping said single portion of a rope over said plurality of pulley rollers provided on said rope-gripping means in a foldback manner;

(e) positioning said single portion of a rope in the grooved surface of said plurality of rollers;

(f) clamping said rope-gripping means down onto said positioned rope;

(g) latching together said rope-receiving means and said rope-gripping means;

(h) drawing said single portion of a rope irreversibly through said latched rope-receiving means and said rope-gripping means to secure the rope in the desired position; and (i) releasing said latch means after use is completed.

9. A rope securing method as recited in claim 8, wherein:

(a) said step of receiving further includes, mounting said rope gripping apparatus at a tie-down point using said eyebolt anchor attachment;

(b) said step of threading further includes, sliding said single portion of a rope through said rope threading channel and directing said rope portion to a most remote of said pulley rollers on said rope-receiving means;

(c) said step of looping further includes, laying said rope portion in said grooved surface of said most remote roller and reversing the direction of the rope;

(d) said step of positioning further includes providing a plurality of pulley rollers having a grooved surface preselected size determined by the size of a particular rope for which the gripping apparatus is manufactured;

(e) said step of clamping further includes, providing said rope-gripping means with said pulley rollers mountedly offset with respect to said pulley rollers attached to said rope-receiving means so as to mesh between each pulley roller on said rope-receiving end member and thereby grip a rope which has previously been threaded ove said pulley rollers on said rope-receiving end member and under said pulley rollers on said rope-gripping roller member; and (f) said step of latching further includes, providing a latch means including a springed latch assembly attached to said rope-receiving means and a latch release arm attached to said rope-gripping means for mechanically communicating with said springed latch assembly.

10. A rope grip apparatus for use in the field of securing articles where rope is used and is typically tied in knots to secured said articles while in transit, use, or storage, said rope grip apparatus comprising:

(a) a rope-receiving means;

(b) a rope-gripping means hingeably attached to said rope-receiving means, said rope-gripping means pivotally gripping said rope;

(c) a roller means attached to said rope-receiving means and saud rope-gripping means;

(d) a ratchet means attached to said roller means; and (e) a latch means attached to said rope-receiving means and said rope-gripping means, said latch means clamping said rope-receiving means to said rope-gripping means and compressively securing said rope therebetween, said rope-receiving means includes a hinge point, an eyebolt anchor attachment and a rope threading channel, said rope-gripping means includes a pivot point coinciding with said hinge point of said rope-receiving means, said roller means includes a plurality of groove pulley rollers, said ratchet means includes a plurality of gear wheels attached to said grooved pulley rollers and a plurality of pawls attached to said rope-receiving means and to said rope-gripping means, and said latch means includes a latch and a latch release.

11. A roller grip apparatus, as recited in claim 10, wherein:

(a) said rope-receiving means includes two side plates;

(b) said rope-gripping means includes two side plates; and (c) said roller means further includes a plurality of grooved pulley rollers fixedly pin mounted and longitudinally spaced between said side plates of said rope-receiving means and said rope-gripping means.

12. A roller grip apparatus, as recited in claim 11, wherein:

(a) said grooved pulley rollers, fixedly pin mounted within said rope-gripping means, are offset with respect to said pulley rollers, fixedly pin mounted within said rope-receiving means; and (b) said grooved pulley rollers mounted within said rope-gripping means mesh between said grooved rollers mounted within said rope-receiving means.

13. A rope grip apparatus for use in the field of securing articles where rope is used and is typically tied in knots to secured said articles while in transmit, use, or storage, said rope grip apparatus comprising:

(a) a rope-receiving means;

(b) a rope-gripping means hingeably attached to said rope-receiving means, said rope-gripping means pivotally gripping said rope;

(c) a roller means attached to said rope-receiving means and said rope-gripping means, said roller means includes a plurality of grooved pulley rollers attached to said rope-receiving means, said roller means further includes a plurality of grooved pulley rollers attached to said rope-gripping means and said rollers attached to said rope-receiving means have grooves which are deeper than similarly provided grooves on said rollers attached to said rope-gripping means;

(d) a ratchet means attached to said roller means; and (e) a latch means attached to said rope-receiving means and said rope-gripping means, said latch means clamping said rope-receiving means to said rope-gripping means and compressively securing said rope therebetween.

14. A rope grip apparatus for use in the field of securing articles where rope is used and is typically tied in knots to secure said articles while in transit, use, or storage, said rope grip apparatus comprising:

(a) a rope-receiving means;

(b) a rope-gripping means hingeably attached to said rope-receiving means, said rope-gripping means pivotally gripping said rope;

(c) a roller means attached to said rope-receiving means and said rope-gripping means;

(d) a ratchet means attached to said roller means; and (e) a latch means attached to said rope-receiving means and said rope-gripping means, said latch means clamping said rope-receiving means to said rope-gripping means and compressively securing said rope therebetween, said latch means comprising, a springed latch assembly attached to said rope-receiving means, a latch release arm assembly attached to said rope-gripping means for mechanically communicating with said springed latch assembly and a pop-up spring mounted on said rope-receiving means.

* * * * *